March 3, 1931. A. W. SILER 1,794,649
PROTECTING AND COOLING MEANS FOR DYNAMO ELECTRIC MACHINES
Filed Jan. 31, 1929
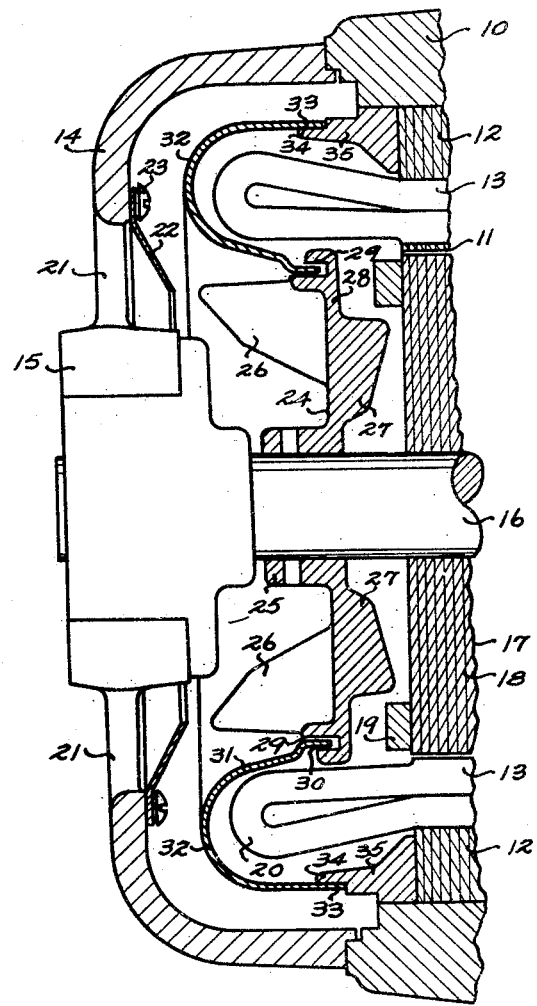
INVENTOR
ALFRED W. SILER
BY
ATTORNEY Patented Mar. 3, 1931

1,794,649

UNITED STATES PATENT OFFICE

ALFRED W. SILER, OF INDIANAPOLIS, INDIANA, ASSIGNOR TO FAIRBANKS, MORSE & CO., OF CHICAGO, ILLINOIS, A CORPORATION OF ILLINOIS

PROTECTING AND COOLING MEANS FOR DYNAMO-ELECTRIC MACHINES

Application filed January 31, 1929. Serial No. 326,345.

This invention relates to improvements in protecting and cooling means for dynamo-electric machines, and particularly to combined ventilating, cooling and protecting apparatus for electric motors.

An object of the present invention is to provide improved means for readily and easily converting an open type motor into a motor of enclosed type, without impairing the existing rating and efficiency of the motor.

A further object is to provide an enclosing apparatus of improved form and construction, which will serve not only as an agitator to cause a current of cooling air to be passed over the conducting parts of an electric motor, but will also serve as a means for effectively and entirely preventing the entrance of dirt or foreign matter to the live parts of the machine.

Further objects and advantages of the present invention will appear from the following detailed description of parts, and the accompanying drawing which shows a vertical sectional elevation of one end of an electric motor to which the improvements have been applied.

The older prevailing devices provided for ventilation of electric motors, or the like, by means of elaborately and expensively constructed fans and impellers with related air channels, either internally or externally of the motor frame. While such devices are no doubt effective, within limits, they add materially to the cost of the machine, and the parts of the machine must usually be designed or altered particularly for the reception of these devices. To the end of obviating the expense and space requirement of such apparatus, it is a further purpose and object to provide an efficient cooling and protecting means which may be attached to an electric motor of the open type, either at the time of manufacture, or be supplied as an accessory, to be attached and installed by a motor user, with a minimum interruption of service.

Further, the older prevailing devices usually employ a plurality of parts, some or all of which are difficult and expensive to manufacture, and which in some cases are characterized by angulate portions and corners which, after a period of motor operation, serve to offer lodging places for dirt or other foreign matter from the surrounding air, which decreases the heat conductivity of the cooling surfaces. The present invention provides a sheet metal structure having the requisite heat conductivity and which is characterized by a smooth contour, which eliminates the possibility of dirt lodging on the device. The parts may be formed of copper or aluminum sheet metal or certain alloys of either of these metals having the requisite heat conductivity.

It will, of course, be understood that the present detailed description and the accompanying drawing, relate to a single preferred executional embodiment of the present invention, and that substantial changes may be made in the described construction of parts without departing from the spirit and scope of the invention.

Referring by numerals to the drawings, 10 designates, generally, an electric motor which may be of any conventional construction. The motor 10 is provided with a stator 11, and a core 12 in which is provided stator windings 13. The stator 11 comprises a part of, or is carried by and within the usual frame of the machine, having, in the present example, end members 14 provided with bearing arms 15 in which are fitted the motor bearings for motor shaft 16. The rotor 17 is in rigid connection with the shaft and comprises by preference, a laminated core portion 18 which is slotted in the usual manner to receive the rotor bars, not shown, each of which is secured to an end ring 19. As particularly pertinent to the present improvements to be described hereinafter, it will be noted that windings 13 have a lateral extending coil portion 20.

Cooling of the windings and live parts of the machine is effected by introducing air through openings 21 formed in the end member 14, which air may be circulated in one end of the motor and out the opposite end thereof, or in some cases may be introduced intermediately of the frame and expelled from both ends of the motor, as is usual in older arrangements. By preference, an air deflecting or guide member 22 is detachably mounted on the end member 14 by means of fastening means 23. The guide member, or baffle, 22 is formed, by preference, of thin sheet metal, and directs inwardly and toward the shaft, the air entering the openings 21.

A combined air impelling and protecting ring member 24, formed preferably of cast metal, is removably mounted on the rotor shaft 16. The member 24 is preferably formed with a hub portion 25, from which extend radial fan elements 26 and 27, which are provided on opposite sides of a wall portion 28. It will be seen that the member 24 is so positioned along the shaft 16, as to form an air channel or space between the member 24 and the rotor of the machine. Beyond the fan elements 26 and 27 and integral with the member 24, is formed, preferably, an annular slot 29, in which one edge 30 of a disc like shield or shroud 31 forms a seal or running fit. The shield 31 is preferably formed of sheet metal of a relatively high heat conductivity. The shield and cooling member 31 is extended upwardly and outwardly from the member 24, and is turned inwardly upon itself to form a substantially cupped portion 32 of arcuate or substantially U shaped section, which, as will be seen from the drawing, serves to enclose the coil portion 20 of the windings. The outermost portion or edge 33 of the shield overlaps an outwardly extending stationary portion 34 of the frame such as a shoe 35, and is fixedly secured thereto. The cooling member 31 is of sufficient rigidity to retain its initial conformity, but it is still of sufficient flexibility to enable the edge 30 to be displaced sufficiently to form a reasonably close, running fit with the adjacent portions of the slot 29, and thereby forms a running seal between elements 24 and 31. This provision prevents the entrance of dirt or foreign matter to the live parts of the machine, from the surrounding atmosphere.

While for convenience of illustration I have shown only one end of a motor equipped according to this invention, it will be understood that the opposite end is, by great preference, similarly equipped with the elements 31 and 24. It is thus seen that a motor provided with the present improvements, is effectively divided into separate air circulating chambers, and that each of such chambers is pocketed or shielded against circulation and intermingling with the air of the other thereof. The obvious effect of the rotation of the fan carrying member 24, will be to insure a complete agitation and circulation of the air against the opposite sides of the shields 31. The enclosed air is cooled by radiation and convection, through the relatively thin sheet metal of the shield and by the circulation set up by the fan element 27. The heat absorbed by the shield 31 is dissipated by the exterior cooling air stream from each of the fans 26. The air is directed to the fan element 26, from the openings 21, by the guide element 22, which also directs an air current from the fan against the outer surface of the shield. The described forced circulation of air around the interior and exterior spaces defined by the shield 31 and member 24, will serve effectively to cool all heating portions of the machine upon operation thereof at any substantial speed.

In use, the device described has been found to be applicable to motors of existing standard construction, and motors equipped in the manner described are at least the full equivalent, so far as performance and characteristics are concerned, of the open type motor, with the added feature of protection of the live parts of the motor from dirt or foreign matter from the surrounding air.

I claim as my invention:

A motor including a motor shaft, a rotor thereon, a stator, stator windings and end members, a combined cooling and protecting device including an annular stator shield formed of a relatively thin sheet metal of high conductivity and being cupped, with its edges extending horizontally and inwardly of the motor, the outer edge being secured to a stationary portion of the machine for fixed support of the shield; a cast sealing ring removably mounted on the motor shaft, in spaced relation to the rotor, and having a slot adapted to receive and form a running fit with the inner edge of the shield, combined radiating and fan blades formed integrally with, and on opposite sides of the sealing ring, and a baffle formed of sheet metal, removably mounted on an end member of the machine, and adapted to deflect a current of cooling air against the outside surface of said shield.

ALFRED W. SILER.